United States Patent
Algreatly

(10) Patent No.: US 9,703,410 B2
(45) Date of Patent: Jul. 11, 2017

(54) REMOTE SENSING TOUCHSCREEN

(71) Applicant: Cherif Atia Algreatly, Newark, CA (US)

(72) Inventor: Cherif Atia Algreatly, Newark, CA (US)

(73) Assignee: Cherif Algreatly, Palo Alto, CA (US)

( * ) Notice: Subject to any disclaimer, the term of this patent is extended or adjusted under 35 U.S.C. 154(b) by 0 days.

(21) Appl. No.: 14/149,807

(22) Filed: Jan. 8, 2014

(65) Prior Publication Data

US 2014/0152603 A1    Jun. 5, 2014

Related U.S. Application Data

(63) Continuation-in-part of application No. 12/587,339, filed on Oct. 6, 2009, now Pat. No. 8,711,109.

(51) Int. Cl.
  *G06F 3/041* (2006.01)
  *G06F 3/0481* (2013.01)
  *G06F 3/0346* (2013.01)

(52) U.S. Cl.
  CPC .......... *G06F 3/0414* (2013.01); *G06F 3/0346* (2013.01); *G06F 3/04815* (2013.01); *G06F 2203/0331* (2013.01); *G06F 2203/04104* (2013.01)

(58) Field of Classification Search
  CPC .. G06F 3/0414; G06F 3/0488; G06F 3/04883; G06F 3/044
  USPC ................. 345/156–179; 178/18.01
  See application file for complete search history.

(56) References Cited

U.S. PATENT DOCUMENTS

| | | | | |
|---|---|---|---|---|
| 6,597,347 B1* | 7/2003 | Yasutake | ............... | G06F 3/0338 178/18.01 |
| 7,453,436 B2* | 11/2008 | Ruiz | ............... | 345/156 |
| 8,711,109 B2* | 4/2014 | Algreatly | ............... | G06F 3/0414 178/18.01 |
| 2008/0231926 A1* | 9/2008 | Klug | ............... | H04N 13/0425 359/23 |
| 2008/0238884 A1* | 10/2008 | Harish | ............... | G06F 3/016 345/174 |
| 2008/0303800 A1* | 12/2008 | Elwell | ............... | G06F 3/0414 345/173 |
| 2009/0082884 A1* | 3/2009 | Bonnat | ............... | G01D 21/00 700/83 |
| 2011/0004327 A1* | 1/2011 | Bonnat | ............... | G06F 3/011 700/83 |
| 2011/0007035 A1* | 1/2011 | Shai | ............... | G06F 3/014 345/179 |

* cited by examiner

*Primary Examiner* — Carolyn R Edwards
*Assistant Examiner* — Mansour M Said

(57) ABSTRACT

A remote sensing system for touchscreen is disclosed. The system is comprised of a surface and a pointer. The surface detects the point of a force exerted on the surface and the three-dimensional direction of the force. The pointer remotely exerts a force on the surface. The point of exerting the force on the surface, the 3D direction of the pointer, and the location of the pointer relative to the surface are then determined. The present invention is utilized in various 3D gaming, entertainment, engineering, and medical applications.

18 Claims, 10 Drawing Sheets

REMOTE SENSING TOUCHSCREEN

CROSS-REFERENCE TO RELATED APPLICATION

This application is a continuation-in-part of a U.S. patent application Ser. No. 12/587,339, filed Oct. 6, 2009, titled "Touch Sensing Technology".

BACKGROUND

The U.S. patent application Ser. No. 12/587,339 discloses a new technology for touchscreens that enables detecting the point of touch between an object and a surface, in addition to, the three-dimensional direction of the object and the force exerted by the object on the surface at the moment of touch. The method of the aforementioned patent application requires the object to be in touch with the surface. If the object is located away from the surface, the method cannot detect any information related to the object. If the object is representing a computer input device and the surface is representing a computer display, in this case, the computer input device cannot remotely interact with the application presented on the computer display.

SUMMARY

The present invention discloses a system for remote sensing that can be utilized with touchscreens, touchpads, or the like. In one embodiment, the system is comprised of a surface and a pointer. The surface is equipped with sensors and a microprocessor capable of detecting the 3D direction and value of the force exerted on the surface. The pointer can be held by a user's hand to be aligned with a 3D direction pointing to a certain spot on the surface. The pointer blows air in the 3D direction, reaching the spot and exerting a force in the 3D direction on the spot. The microprocessor determines the location of the spot on the surface, the 3D direction of the pointer, and the distance of the pointer relative to the surface.

In one embodiment, the surface is a transparent sheet that can be positioned on a computer screen. The microprocessor provides the computer system with data representing the location of the spot on the surface, the 3D direction of the pointer, and the distance of the pointer relative to the surface. The location of the spot represents a corresponding point in three-dimensions on the computer display. The 3D direction of the pointer represents a corresponding direction of movement in three-dimensions on the computer display. The distance of the pointer relative to the surface represents a corresponding distance in three-dimensions on the computer display. In this case, the system of the present invention can be utilized to serve various 3D computer applications.

In another embodiment, the system is comprised of a surface and a pointer. The surface is equipped with sensors and a microprocessor capable of detecting the value of the perpendicular force exerted on the surface. The pointer can be held by a user's hand to point to a certain spot on the surface. The pointer blows air towards the spot to exert a perpendicular force on the spot. The microprocessor then determines the location of the spot that receives the blown air from the pointer.

In one embodiment, the surface is a transparent sheet that can be positioned on a computer display. The microprocessor provides the computer system with data representing the location of the spot on the surface. The location of the spot represents a corresponding point in two-dimensions on the computer display. Once the direction of the pointer is changed relative to the surface, the blown air touches another spot which determines another point in two-dimensions on the computer display. Accordingly, changing the pointer direction manipulates the computer cursor to move from one point to another in two-dimensions on the computer display.

Generally, the present invention of a remote sensing touchscreen is utilized in various two-dimensional and three-dimensional gaming, entertainment, engineering, and medical applications as will be described subsequently. However, the above Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In one embodiment, the present invention discloses a remote sensing system comprised of;

- a surface which is a transparent flat sheet that can be positioned on a computer display;
- a pointer that can be positioned at a distance from the surface to blow air in a three-dimensional direction towards a spot on the surface and exert a force on the spot;
- a sensing unit that detects the location of the spot, the three-dimensional direction, and the value of the force; and a microprocessor that receives the data of the location, the three-dimensional direction, and the value to determine the distance and provide the computer system with an immediate input representing the three-dimensional direction and the distance.

Figure 1:
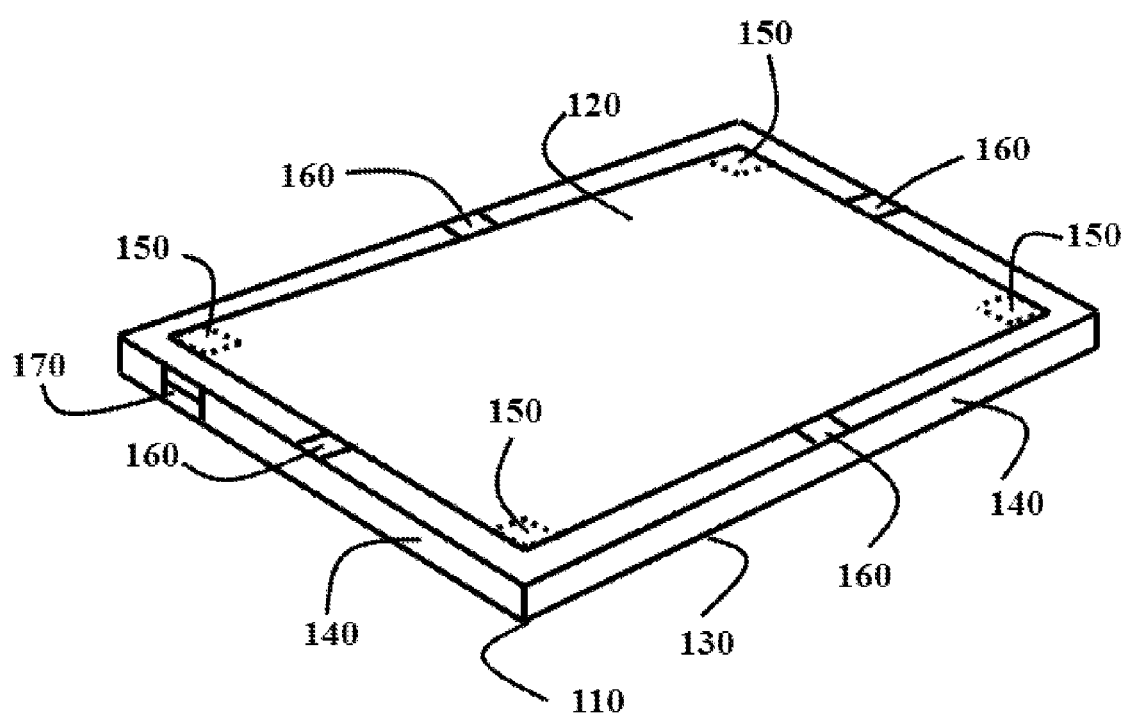
FIG. 1 illustrates the surface of the present invention comprised of a front side, a back side, four edges, a plurality of sensors, and a microprocessor.

FIG. 1 illustrates an example of the surface in the form of a transparent panel 110 comprised of a front side 120, back side 130, and four edges 140. The front side is a thin, flat board separated from the back side and the four edges. The back side and the four edges are also thin flat boards attached to each other as shown in the figure. A first plurality of sensors 150 is located beneath the front side to detect the perpendicular force exerted on the front side plane. A second plurality of sensors 160 is located on the boundaries of the front side, between these boundaries and the four edges, to detect the force exerted parallel to the front side plane. A microprocessor 170 is attached to the surface to receive the signal generated by the sensors.

Figure 2:
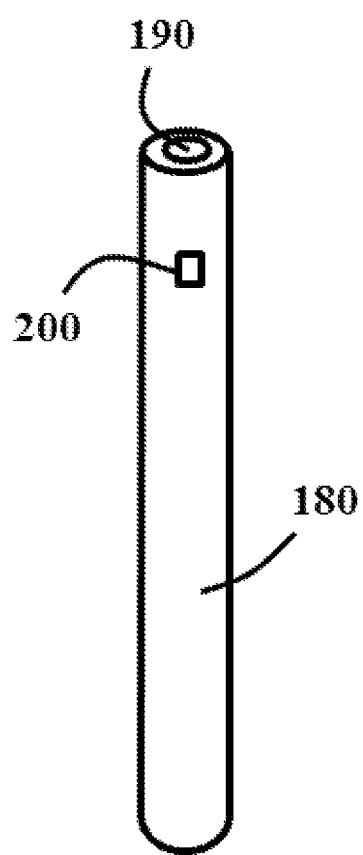
FIG. 2 illustrates the pointer of the present invention where an opening is located at one end of the pointer.

FIG. 2 illustrates an example of the pointer 180 in the form of a cylinder with an opening 190 located at one end of the cylinder. The opening allows the air to be blown from the pointer in the direction of the cylinder axial. A small fan, which blows the air, is located inside the pointer. The pointer can be held by a user's hand to direct the air to any location or spot on the surface. The pointer includes a button 200 that enables the user to control the speed of the blown air.

Figure 3:
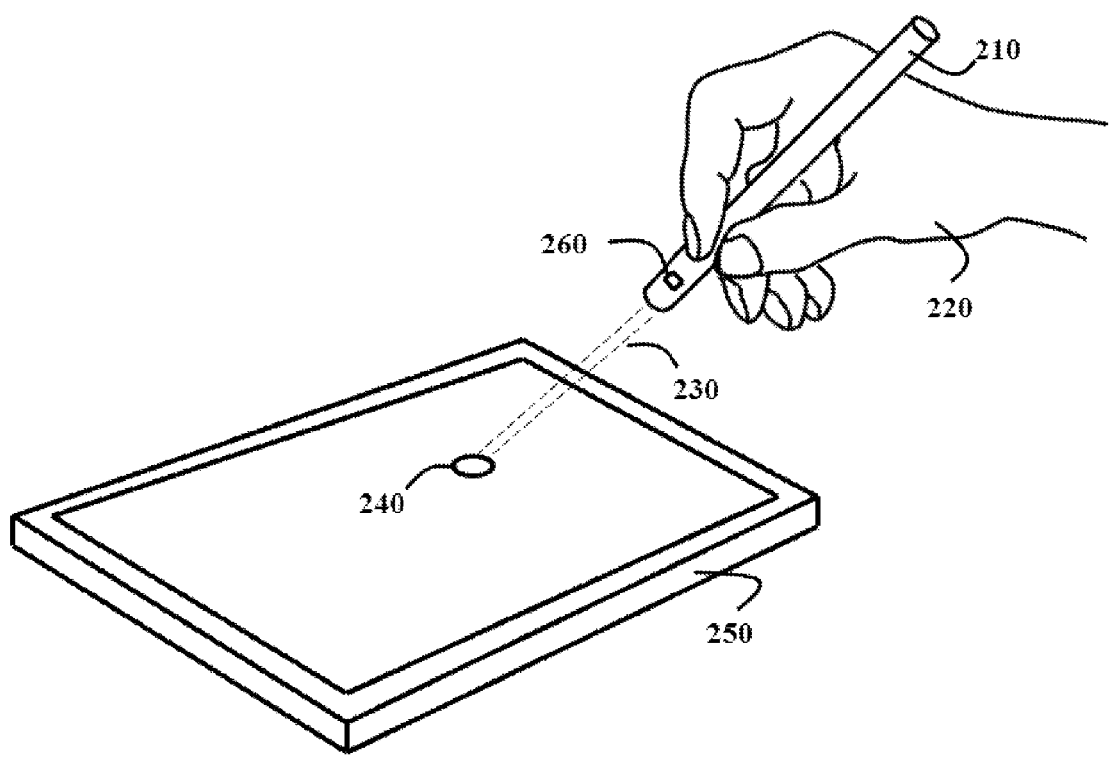
FIG. 3 illustrates using the pointer to point to a specific spot on the surface.

FIG. 3 illustrates holding the pointer 210 by a user's hand 220 to align the blown air 230 to target a specific spot 240 on the surface 250. Once the blown air reaches the spot the microprocessor determines the location of the spot on the surface, the 3D direction of the pointer, and the distance of the pointer relative to the surface. The 3D direction of the pointer represents the direction of the cylinder axial. The button 260 on the pointer controls the speed of the fan, which controls the speed of the blown air.

As described in the U.S. patent application Ser. No. 12/587,339, each one of the first plurality of sensors detects a partial value of a first force exerted from the blown air perpendicular to the front side plane. Also, each one of the second plurality of sensors detects a partial value of a second force exerted from the blown air parallel to the front side plane. Analyzing the partial values of the first force and the partial values of the second force determines the location of the spot on the surface, the value of the force, and the 3D direction of the force.

The 3D direction of the force represents the 3D direction of the pointer or the pointer axial. The value of the force represents the force exerted from the blown air on the location of the spot. Comparing the value of the force of the blown air with a database, that associates each value of a force with a corresponding distance between the pointer and the surface, determines the distance of the pointer relative to the surface. Knowing the 3D direction of the pointer, the distance of the pointer relative to the surface, and the point of intersection between the imaginary extension of the pointer axial and the surface, determines the exact position and configuration of the pointer relative to the surface. The imaginary extension of the pointer axial is represented by the air blown from the pointer to the surface spot.

The database can be pre-prepared or created by positioning the pointer at different distances from the surface to measure and store the force exerted on the surface with each different distance. As mentioned previously, the pointer has a button that controls the speed of the blown air, which affects the value of the force exerted on the surface. To include the effect of the change of the speed of the blown air, for each different speed of the blown air a database is created to associate the each different force with a distance. Once the user changes the speed of the blown air by pressing the button, a signal is generated to provide the microprocessor with data representing the new speed of the blown air.

It is important to note that the weight of the front side of the surface exerts a force on the first plurality of sensors when the surface is horizontally positioned. Also, the weight of the front side of the surface exerts a force on the second plurality of sensors when the surface is vertically positioned. When the surface is tilted, the weight of the front side of the surface exerts forces on the first plurality of sensors and the second plurality of sensors. These type of forces exerted on the sensors are taken into consideration during the process of analyzing and determining the force exerted from the blown air on the surface.

In one embodiment of the present invention, the surface is a thin transparent panel positioned on a computer screen while the microprocessor is wirelessly connected to the computer to provide the computer system with an immediate input representing the location of the spot, the 3D direction of the pointer, and the distance of the pointer relative to the surface. In various 3D computer applications, such data is important in interacting with the 3D virtual environments presented on the computer display.

Figure 4:
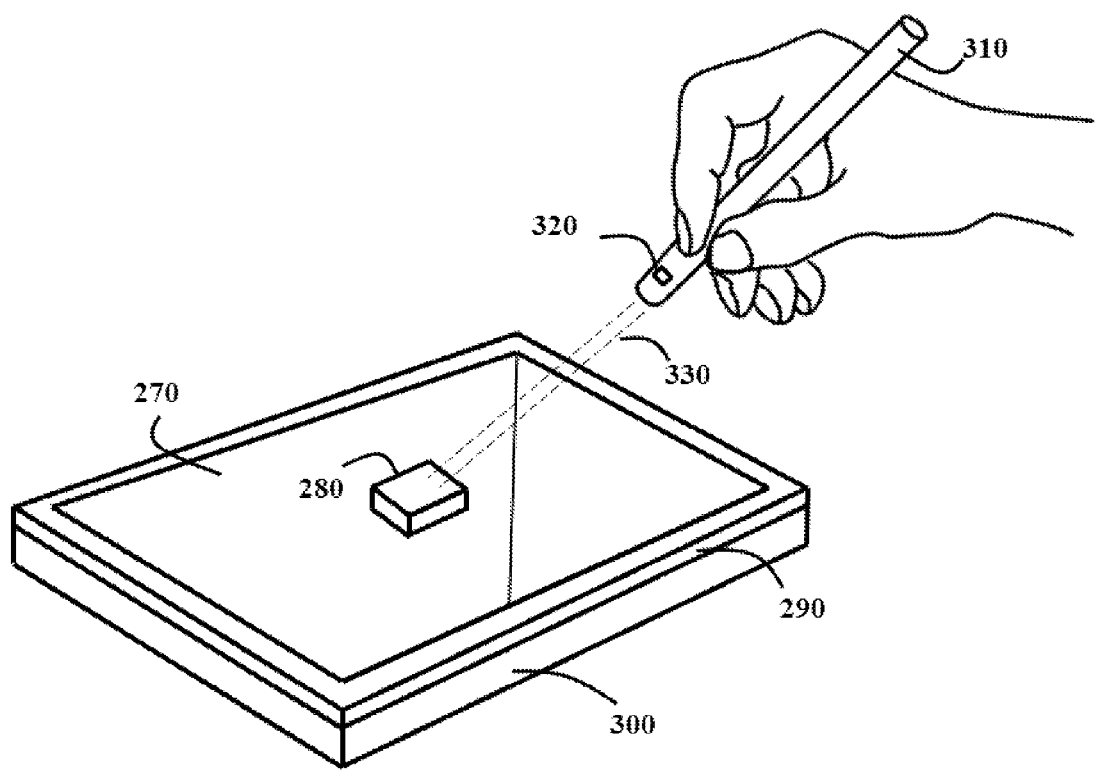
FIG. 4 illustrates selecting a virtual object by the pointer on the computer display.
Figure 5:
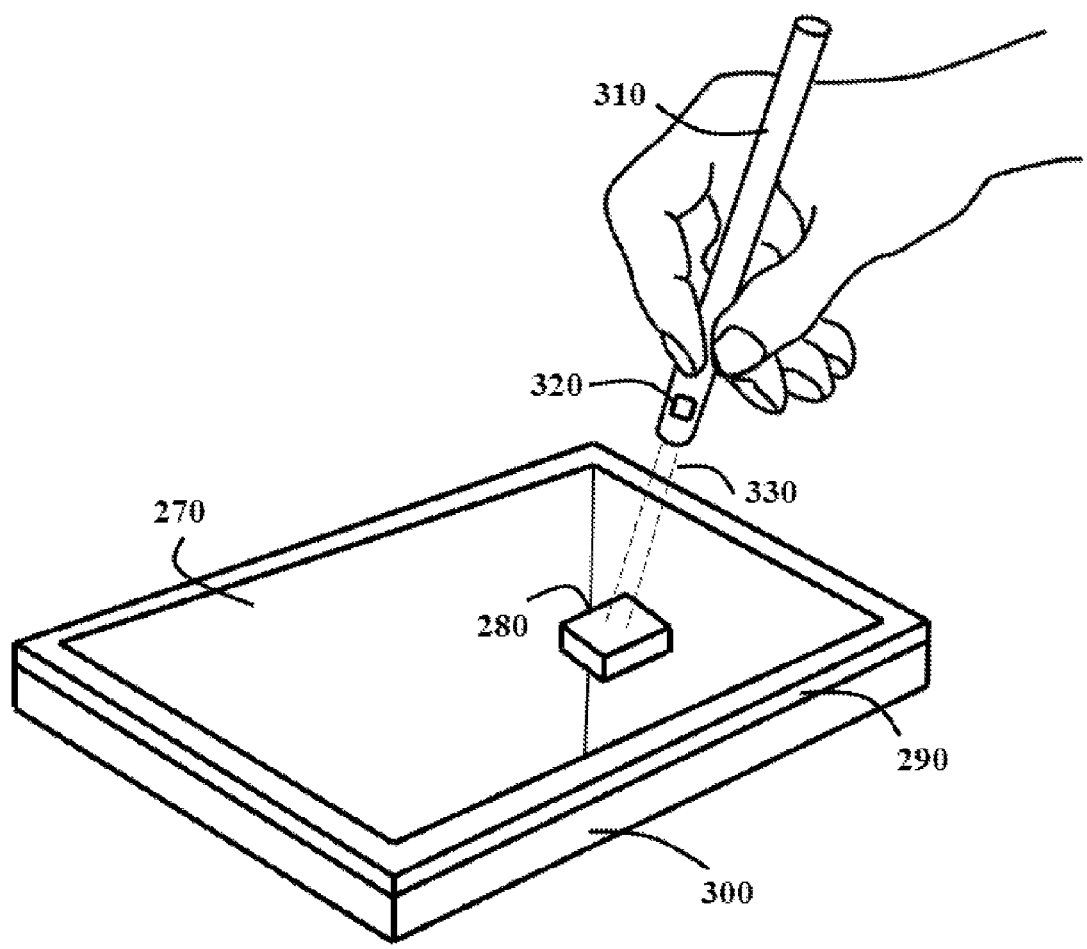
FIG. 5 illustrates moving the virtual object to a new position on the computer display by directing the pointer to this new position.

For example, FIG. 4 illustrates a 3D environment 270 presented on a computer screen where a virtual object 280 is located inside the 3D environment. The surface 290 of the present invention is positioned on the computer screen 300, as shown in the figure. A user's hand holds the pointer 310 and directs the pointer axial towards the virtual object, as an indication for selecting this virtual object. The button 320 of the pointer, and an indication for the blown 330 are also depicted in the figure. In FIG. 5 the user redirects the pointer to a new position on the computer display to simultaneously move the virtual object to this new position.

Figure 6:
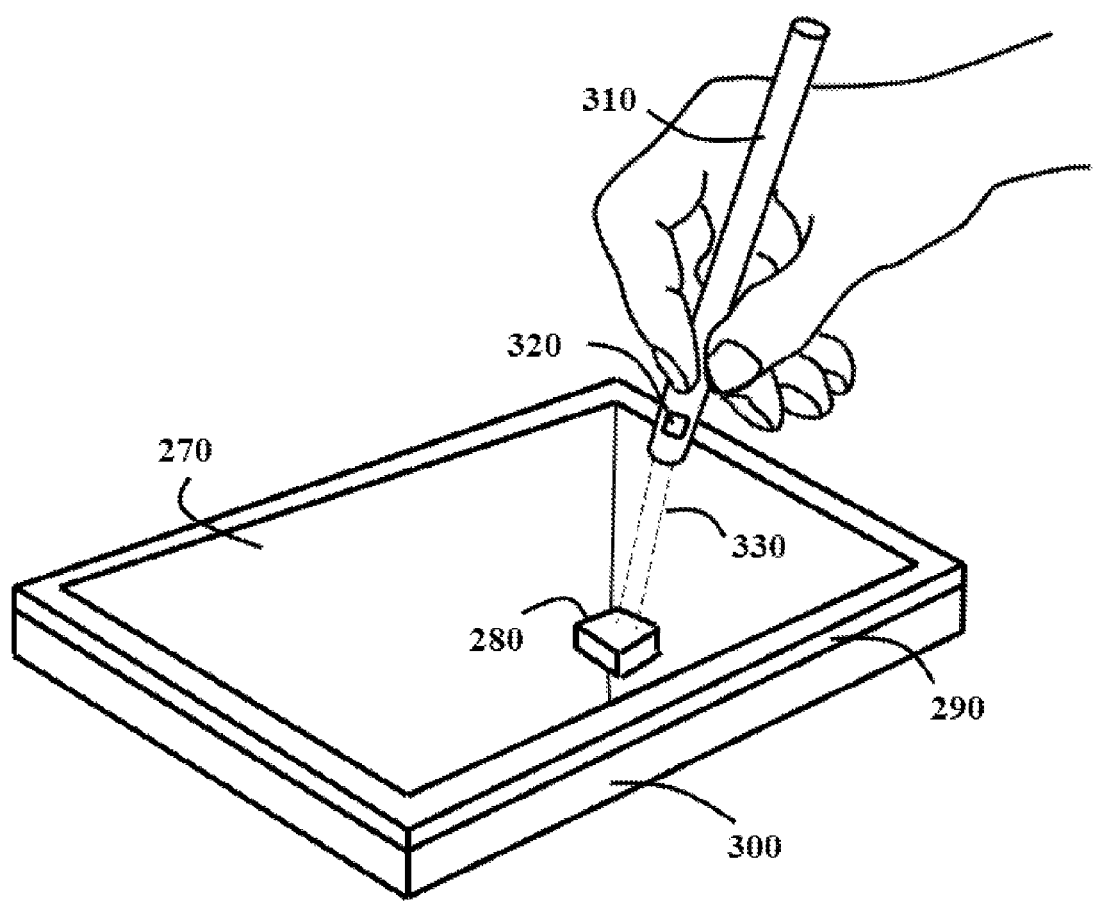
FIG. 6 illustrates moving the pointer closer to the computer display to simultaneously move the virtual object away on the computer display.
Figure 7:
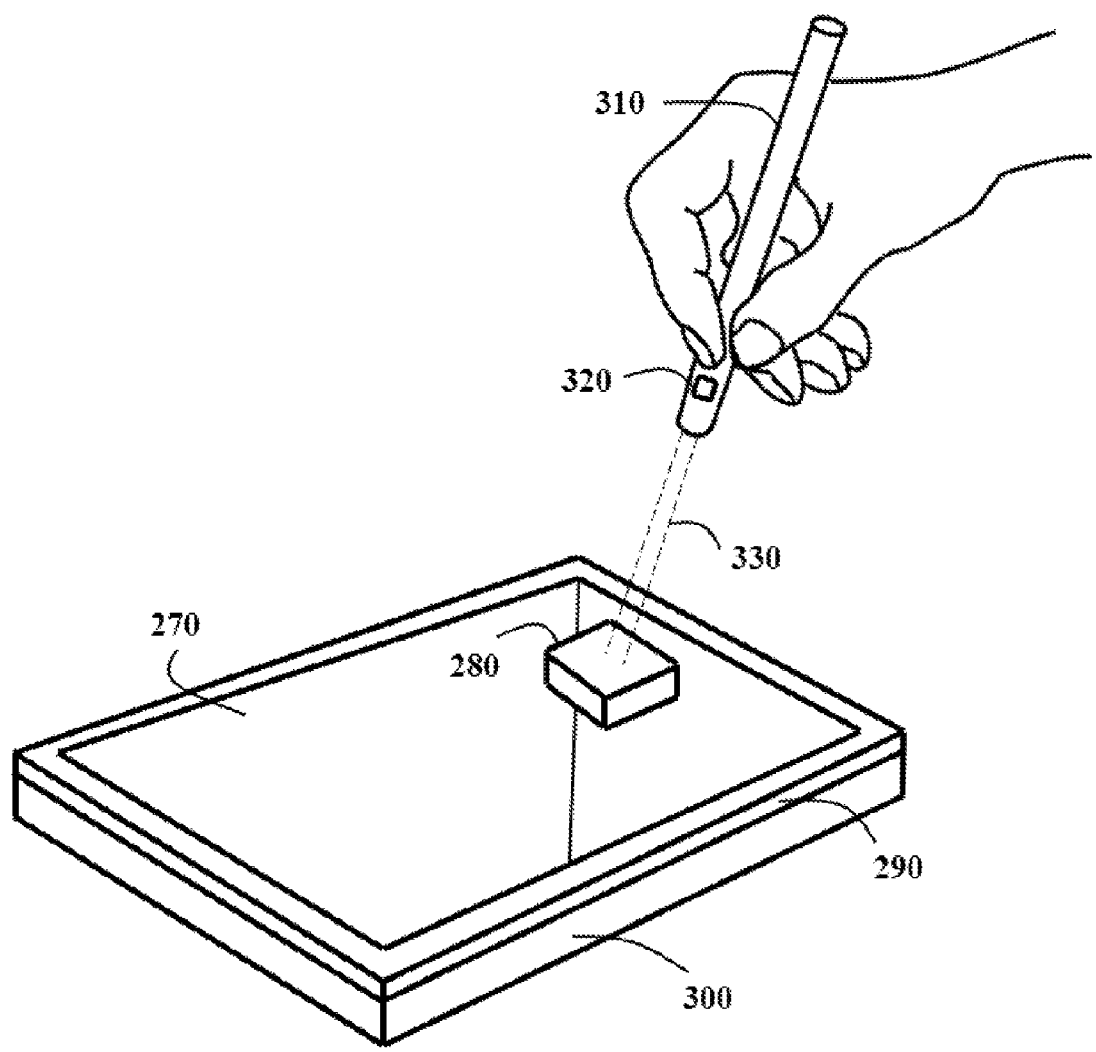
FIG. 7 illustrates moving the pointer away from the computer display to simultaneously move the virtual object closer on the computer display.

In FIG. 6, the user moves the pointer closer to the computer screen, while keeping the same 3D direction of the pointer to simultaneously move the virtual object away from the computer screen. In FIG. 7 the user moves the pointer away from to the computer screen, while keeping the same 3D direction of the pointer, to simultaneously move the virtual object closer to the computer screen. If the user needs to increase/decrease the movement of the virtual object relative to the pointer movement, the user presses the button 320 to increase/decrease the speed of the blown air. In this case, changing the speed of the blown air changes the force exerted on the surface. Changing the force exerted on the surface is interpreted as an indication for changing the movement speed of the virtual object during the pointer movement.

Figure 8:
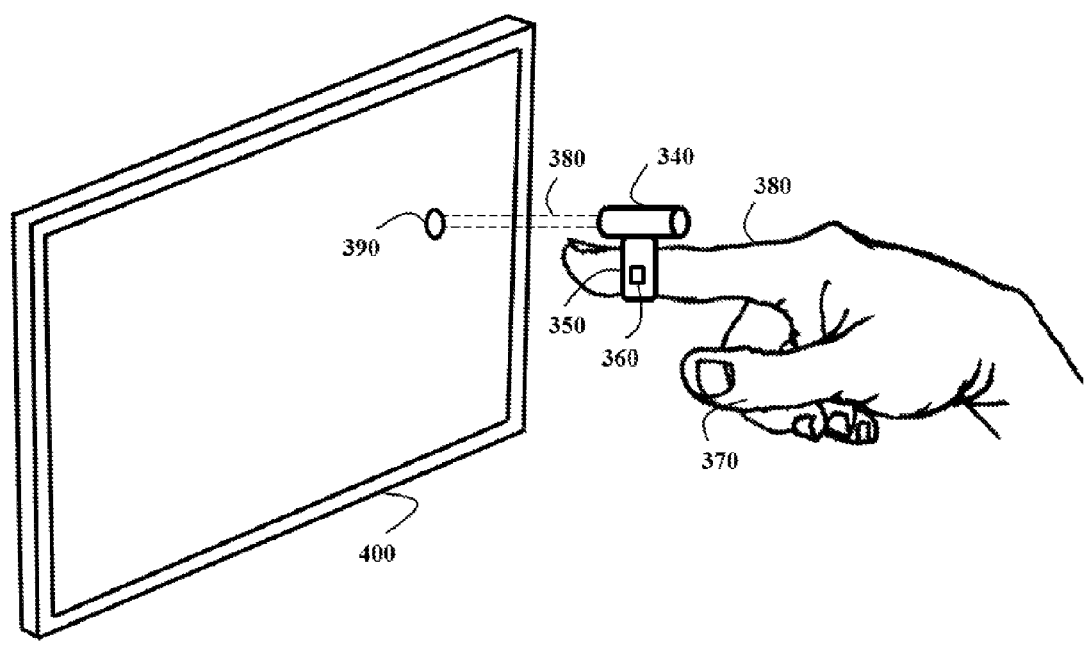
FIG. 8 illustrates attaching a small pointer to a finger to move or tilt the small pointer with the movement or tilting of the finger.

FIG. 8 illustrates a different way for using a pointer with a small size. As shown in the figure, a small pointer 340 is attached to a finger ring 350 while the button 360 is located on the finger ring to be accessible to the thumb 370. The finger ring is worn on the index finger 380 to point to a spot 390 located on the surface 400 when the index finger is pointing to the same spot. The main advantage of using such a small pointer is that the hand can perform other actions, such as typing on a keyboard or writing with a pen while holding the pointer with the finger ring.

In one embodiment, two additional buttons are utilized with the pointer to provide the same functions of the left and right buttons typically located on a computer mouse. In this case, the two additional buttons enables the user to select, drag, or drop the virtual objects in 3D on the computer display. In another embodiment, the pointer includes two openings instead of one opening, where the two openings are simultaneously blowing air at two different spots on the surface. The main reason for using two openings is to enable tracking the rotation of the pointer about its axial.

Figure 9:
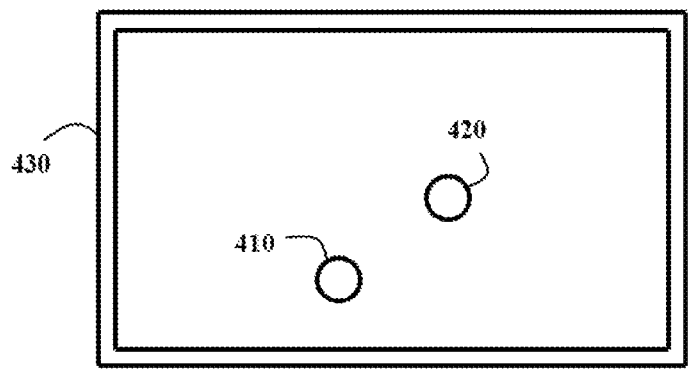
FIG. 9 illustrates a first spot and a second spot detected on the surface when using a pointer with two openings.
Figure 10:
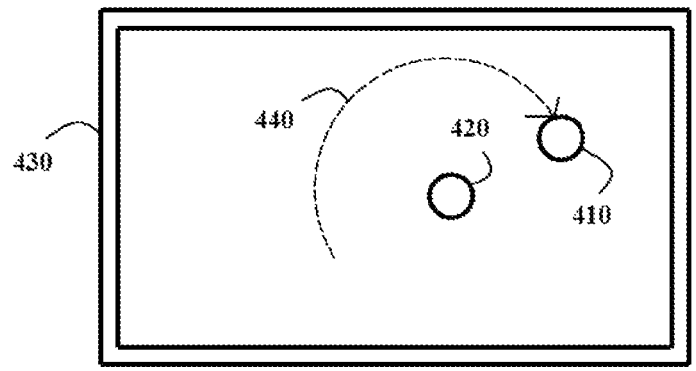
FIG. 10 illustrates rotating the first spot in a clockwise rotation around the second spot when the pointer is rotated in a clockwise rotation about its axial.
Figure 11:
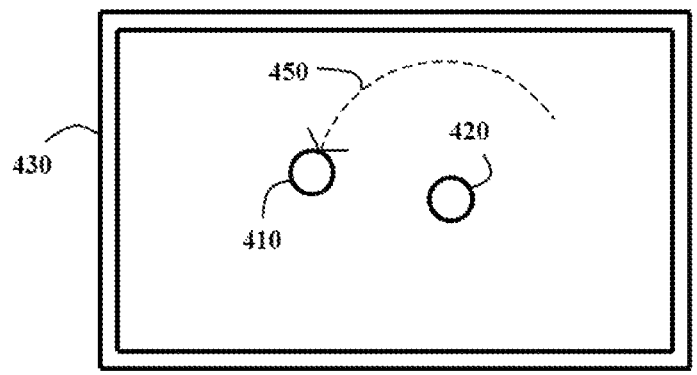
FIG. 11 illustrates rotating the first spot in a counter-clockwise rotation around the second spot when the pointer is rotated in a counter-clockwise rotation about its axial.

For example, FIG. 9 illustrates a first spot 410 and a second spot 420 detected on the surface 430 of the present invention as a result of using a pointer with two openings. FIG. 10 illustrates rotating the first spot in a clockwise rotation 440 around the second spot when the pointer is rotated in a clockwise rotation about its axial. FIG. 11 illustrates rotating the first spot in a counter-clockwise 450 rotation around the second spot when the pointer is rotated in a counter-clockwise rotation about its axial. Generally, as described in the U.S. patent application Ser. No. 12/587,339, to detect multiple forces simultaneously exerted on multiple spots on a surface, the number of sensors is increased.

In one embodiment of the present invention, detecting multiple spots on the same surface is also utilized in interacting with two or more pointers at the same time. In this case, each pointer will have a unique speed of its blown air as an indication for the pointer ID. For example, in this case of simultaneously using three pointers with the same surface, the first pointer will have the least air speed, the second pointer will have the intermediate air speed, and the third pointer will have the greatest air speed. Using this technique enables multiple users to simultaneously interact with the same 3D computer application on the computer display.

Figure 12:
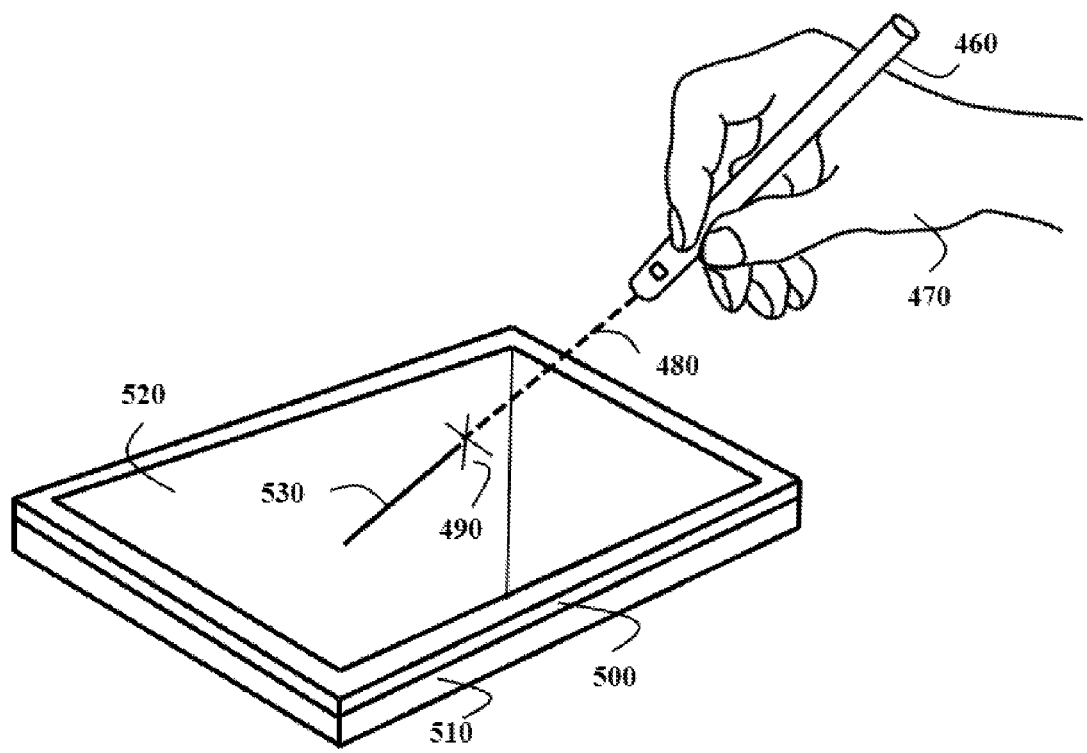
FIG. 12 illustrates a light beam extending from the opening of the pointer through a 3D virtual environment presented on a computer display.

FIG. 12 illustrates one of the innovative utilization of the present invention. As shown in the figure, a pointer 460 is held by a user's hand 470 where a light beam 480 extends from the opening to a spot 490 on the surface 500 of the present invention which is positioned on a computer display 510. The extension of the light beam along the 3D virtual environment 520 is represented by a virtual ray 530 to give the feeling of the penetration of the light beam in the 3D virtual environment on the computer display. The light beam is generated by a light source located inside the pointer. The advantage of using such a system is it that makes the 3D virtual environment appear like a real environment that integrates the light beam and the virtual ray in one smooth illusion on the computer display.

One of the major advantages of the present invention is simply and easily providing six degrees of freedom to the computer system. The six degrees of freedom are represented by a movement along the x, y, or z-axis, and a rotation about the x, y, or z-axis. To provide a movement along the positive or negative x-axis, the pointer is moved from right to left, or from left to right. To provide a movement along the positive or negative y-axis, the pointer is moved from up to down, or from down to up. To provide a movement along the positive or negative z-axis, the pointer is moved forward or backward.

To provide a clockwise rotation or a counter-clockwise rotation about the x-axis, one end of the pointer is moved in a circle around the x-axis. To provide a clockwise rotation or a counter-clockwise rotation about the y-axis, one end of the pointer is moved in a circle around the y-axis. To provide a clockwise rotation or a counter-clockwise rotation about the z-axis, one end of the pointer is moved in a circle around the z-axis. Providing six degrees of freedom to the computer system is critical to various 3D gaming and engineering computer applications.

Although the system of the present invention is mainly utilized with three-dimensional computer applications, but it can also be utilized with the two-dimensional computer applications. In this case, there is no need to detect the 3D direction of the pointer or the distance of the pointer relative to the surface. The only information needed is the position on the surface that the pointer is pointing to it. Achieving this enables the pointer to manipulate the computer cursor to move in two-dimensions on the computer display.

Accordingly, in another embodiment, the present invention discloses a remote sensing system comprised of;
a surface which is a transparent flat sheet that can be positioned on a computer display;
a pointer that can be positioned at a distance from the surface to blow air towards a spot on the surface and exert a force on the spot; and
a sensing unit that detects the location of the spot and provides the computer system with an immediate input representing the location.

Finally, the spot location on the surface, the 3D direction and value of the force exerted on the surface can be determined by using tracking cameras. In this case, the surface is made from a fixable material that bends when the blown air touches it. The tracking cameras capture the bending of the surface from different points of view to form a 3D model representing the bending shape. The location of the bending represents the spot location, the 3D shape of the bending indicates the 3D direction of the blown air, and the depth of the bending indicates the value of the force exerted by the blown air on the surface. The cameras are connected to a computer system that performs the analysis of the pictures using a computer vision program, as known in the art.

Conclusively, while a number of exemplary embodiments have been presented in the description of the present invention, it should be understood that a vast number of variations exist, and these exemplary embodiments are merely representative examples, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below. Therefore, the foregoing description provides those of ordinary skill in the art with a convenient guide for implementation of the disclosure, and contemplates that various changes in the functions and arrangements of the described embodiments may be made without departing from the spirit and scope of the disclosure defined by the claims thereto.

The invention claimed is:

1. A remote sensing touchscreen system comprised of;
a 3D transparent panel with multiple faces to be positioned on a computer display;
a plurality of sensors to be in contact with each face of the multiple faces;
a pointer to remotely blow air on one face of the multiple faces and generates a light beam extending from the pointer to a virtual object presented on the computer display;
a database that associates each output of the plurality of sensors with a corresponding movement of the virtual object; and
a microprocessor to receive the output of the plurality of sensors and check the database to manipulate the movement of the virtual object according to the database.

2. The remote sensing touchscreen system of claim 1 wherein the air exerts a force on the one face.

3. The remote sensing touchscreen system of claim 1 wherein the pointer is aligned in a three-dimensional direction is represented by a first angle located between the plane of the one face and a line representing the three-dimensional direction, and a second angle located between the projection of the line on the plane and the x-axis of the plane.

4. The remote sensing touchscreen system of claim 1 wherein each one of the plurality of sensors is a force sensor.

5. The remote sensing touchscreen system of claim 1 wherein more than one sensor of the plurality of sensors are in contact with each face of the multiple faces.

6. The remote sensing touchscreen system of claim 1 the microprocessor is wirelessly connected to the computer system of the computer display.

7. The remote sensing touchscreen system of claim 1 wherein the speed of the blown air represents the speed of moving the virtual object on the computer display.

8. The remote sensing touchscreen system of claim 1 wherein the change of the distance of the pointer relative to the one face represents a location change of the virtual object on the computer display.

9. The remote sensing touchscreen system of claim 1 wherein the pointer is equipped with a button to change the value of the blown air force.

10. The remote sensing touchscreen system of claim 1 further the pointer is attached to a finger ring that can be worn on a hand's finger.

11. The remote sensing touchscreen system of claim 1 wherein the light beam represents the three-dimensional direction of the pointer.

12. The remote sensing touchscreen system of claim 1 wherein the imaginary extension of the light beam behind the 3D transparent panel is represented by a virtual ray presented on the computer display.

13. The remote sensing touchscreen system of claim 1 wherein the blown air simultaneously applies two forces on two spots located on the one face wherein the direction of the two spots relative to each other represents the rotation of the pointer.

14. The remote sensing touchscreen system of claim 13 wherein the rotation of the pointer about the x, y, or z-axis represents a rotation of the virtual object about the x, y, or z-axis on the computer display.

15. The remote sensing touchscreen system of claim 1 wherein the 3D transparent panel matches the shape of the computer display.

16. The remote sensing touchscreen system of claim 1 further two or more pointers are used wherein each one of the two or more pointers blows air with a different force representing the identity of a pointer of the two or more pointers.

17. The remote sensing touchscreen system of claim 16 wherein the two or more pointers are simultaneously used.

18. The remote sensing touchscreen system of claim 17 wherein the two or more pointers are simultaneously used by two or more users to interact with the same computer application presented on the computer display.

* * * * *